Sept. 13, 1960  A. B. SKROMME  2,952,465
FARM IMPLEMENT FOR CHOPPING OR UNLOADING
Filed Jan. 9, 1958  3 Sheets-Sheet 1
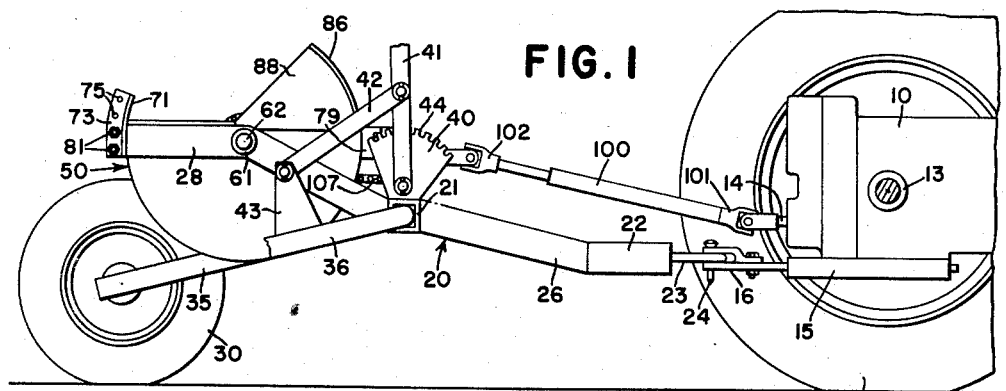
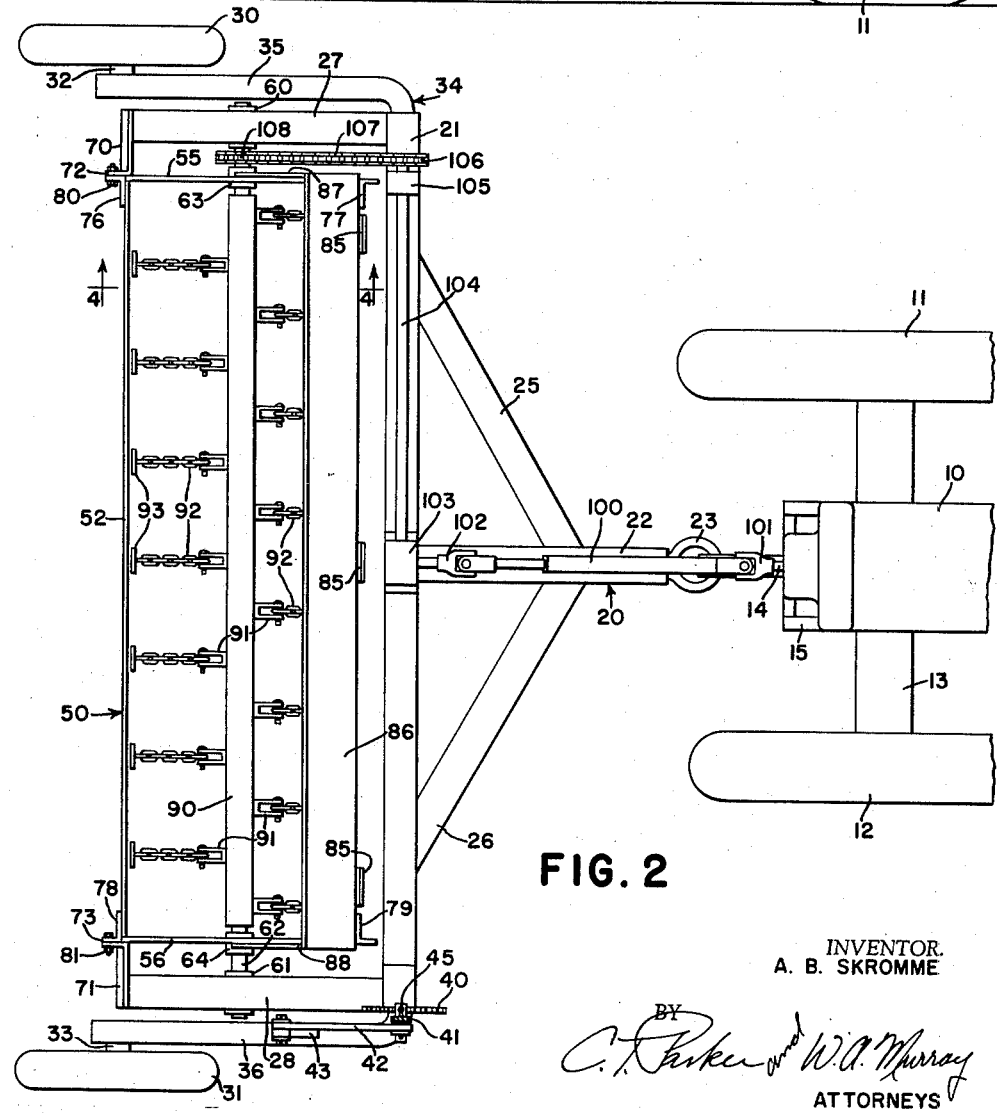
INVENTOR.
A. B. SKROMME
ATTORNEYS Sept. 13, 1960 A. B. SKROMME 2,952,465
FARM IMPLEMENT FOR CHOPPING OR UNLOADING
Filed Jan. 9, 1958 3 Sheets-Sheet 2

INVENTOR.
A. B. SKROMME

ATTORNEYS

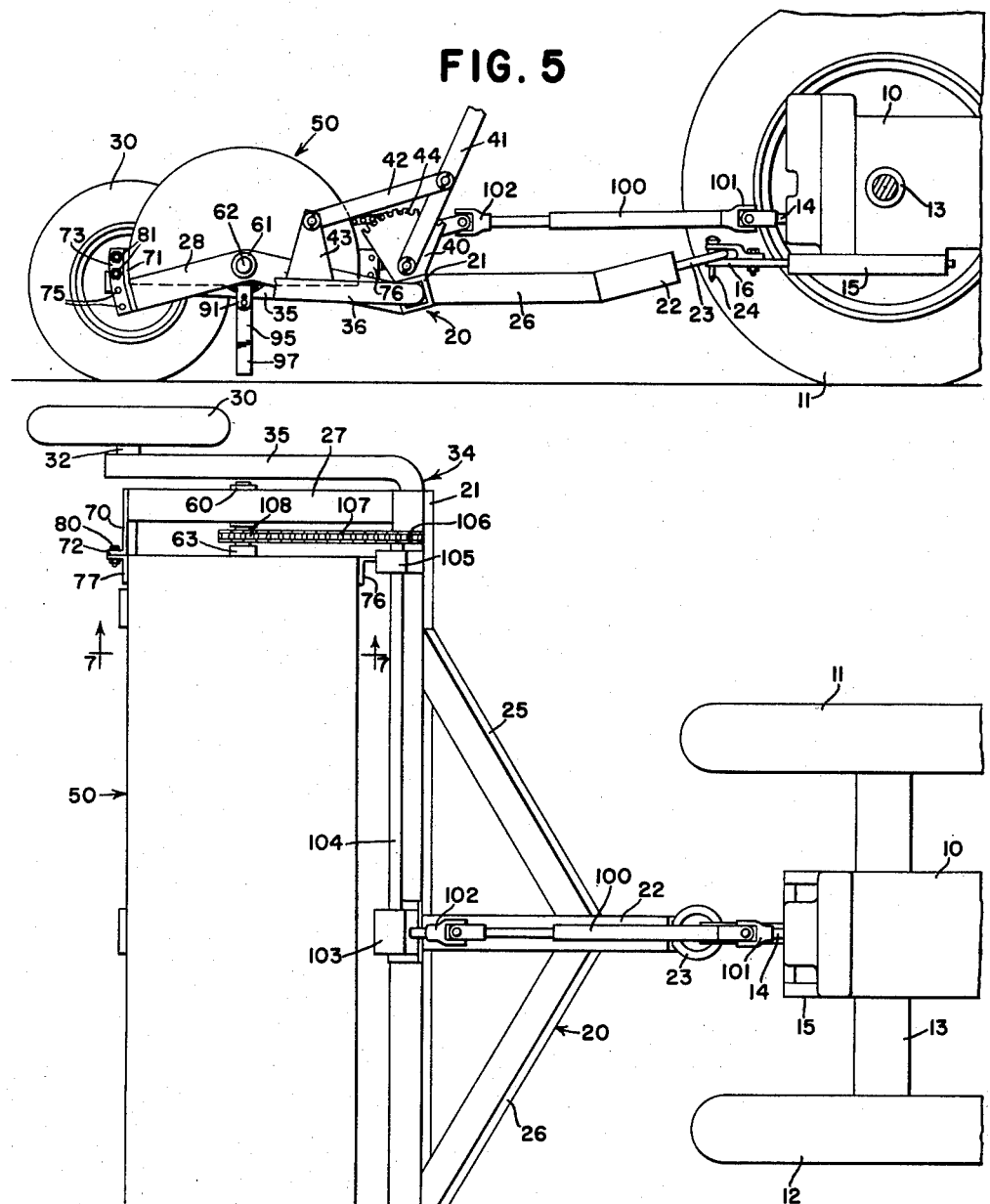

United States Patent Office 2,952,465
Patented Sept. 13, 1960

2,952,465

FARM IMPLEMENT FOR CHOPPING OR UNLOADING

Arnold B. Skromme, Moline, Ill., assignor, by mesne assignments, to Deere & Company, a corporation of Delaware Filed Jan. 9, 1958, Ser. No. 707,881

5 Claims. (Cl. 275—3)

This invention relates to a farm implement and more particularly to an implement which may be used for two distinct and separate operations in handling material, the first operation being that as a material unloading implement and the second operation being that of a field chopper.

In U.S. Patent 2,886,333 issued to H. M. Harris, there is therein described a material unloading implement which features a mobile frame movable forwardly over the ground and having an elongated transversely disposed body or material container of U-shaped cross section. Mounted in the material container is a transverse rotatable shaft having flexible arm elements fixed axially on the shaft and extending radially to pick up material in the container and to guide the material over the rear side of the container. It is contemplated that the present invention may be considered as an improvement over the invention set forth in the Harris application although, in a broader sense the implement herein to be described is unique in its multiplicity of uses.

It is the main purpose or object of the present invention to incorporate with the Harris type of material unloader means which will permit the material container or implement body to be moved relative to the ground and adjusted angularly about the axis of the shaft containing the arms or flail elements. By providing adjustments of this nature, the material container which would normally open upwardly may be reversed to open downwardly and the arm and flail elements may operate as chopping elements, thereby making the implement adaptable for use as a hay chopper or other type of field chopping implement generally and conventionally used on a farm.

Other objects and advantages of the present invention will become apparent to those skilled in the art as the nature of the invention is better understood from the following description and as shown in the accompanying drawings.

Fig. 1 is a side view of the implement and a portion of the tractor with the implement operating as a material unloader. Portions of the tractor and implement are removed for purpose of clarity.

Fig. 2 is a plan view of the implement and portion of the tractor as shown in Fig. 1.

Fig. 5 is a side view similar to Fig. 1 with the implement adjusted to a position in which it is utilized as a field chopper.

Fig. 6 is a view similar to Fig. 2 showing the implement adjusted as in Fig. 5.

Figure 3:
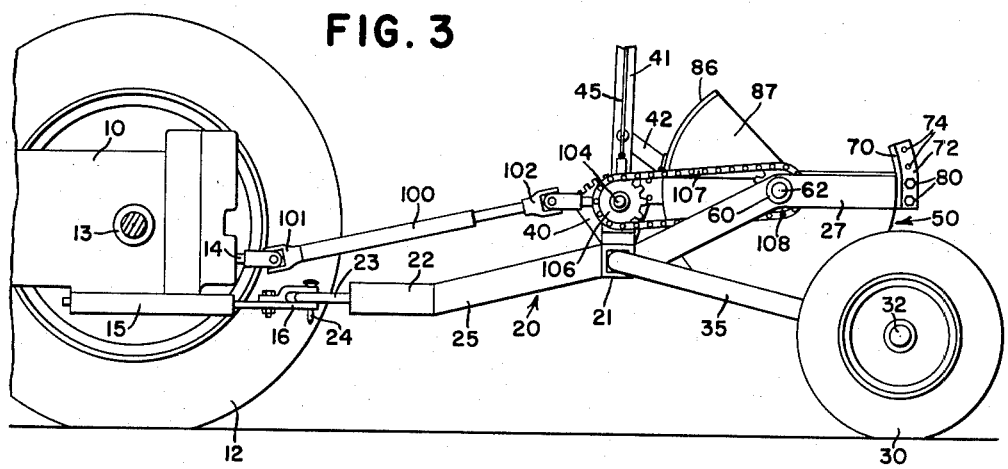
Fig. 3 is a side view similar to Fig. 1 taken from the opposite side.

The implement is pulled by a tractor having an elongated body 10 carried at its rear on a pair of transversely spaced wheels 11, 12 on opposite ends of a transverse axle structure 13. The tractor 10 has a conventional power take-off shaft 14 extending rearwardly from the body 10 and a drawbar structure 15 mounted on the underside of the body 10 and extending rearwardly from the tractor to terminate at its rearward end in a clevis type connection 16. These and all other features of the tractor are conventional and consequently details are neither shown nor described relative to those features.

The implement is comprised of a main frame, indicated in its entirety by the reference numeral 20. The frame 20 is composed of a front transverse beam 21, which is box-like in cross section, extending across the front end of the implement. A forwardly extending tongue or beam 22 is connected to the central portion of the beam 21 and extends forwardly to a rigidly connected eye 23 which is adapted for connection to the clevis 16 by means of a drop pin 24. A pair of forwardly converging braces 25, 26 extend from outer portions of the beam 21 forwardly to the tongue member 22. Also included as a part of the main frame 20 are a pair of side beams 27, 28 which are fixed to and extend rearwardly from opposite ends of the forward cross beam 20.

The main frame 20 is supported, as previously mentioned at its front end by the draw bar 15 and its rear end by a pair of transversely spaced wheels 30, 31 carried by short stub axles 32, 33. Supporting the wheel means 30, 31, 32, 33 is a crank axle, indicated in its entirety by the reference numeral 34, which includes a transverse elongated central portion extending across the forward section of the implement and supported in the hollow center of the box-like beam 21, and a pair of rearwardly extending integral portions 35, 36. The rear ends of the portions 35, 36 are connected to the stub axles 32, 33.

The main frame 20 may be adjusted vertically and relative to the ground by means of a quadrant 40 and associated lever 41 which is connected directly to the right leg portion 36 of the crank axle 34 by means of a link 42. The rear end of the link 42 is pivotally connected to an upwardly extending bracket 43 which has its lower edge fixed to the portion 36 of the crank axle 34. Obviously, therefore, movement of the lever forwardly will cause the wheels 30, 31 to move upwardly relative to the frame 20 or will in effect cause the frame and the remainder of the implement to move closer to the ground, and movement of the lever 41 rearwardly will cause the wheels 30, 31 to raise the implement frame 20. Teeth 44 are provided on the upper edge on the quadrant 40 and operate in conjunction with a conventional type lock, indicated in its entirety by the reference numeral 45, to hold the lever 41 in any of a plurality of fixed positions.

The implement body or material container as indicated by the reference numeral 50 is of semi-cylindrical or U-shape and has fore-and-aft spaced apart and upwardly extending transverse side walls 51, 52 interconnected by a transverse wall portion 53. The U-shaped body 50 operates in one form of the invention to have its concavity opening upwardly and in another form to have its concavity opening downwardly. The body 50 also includes end walls 55, 56 which close the end of the semi-cylindrical container.

Journaled in the side beams 27, 28 by bearings 60, 61 are opposite ends of a transverse drive shaft 62. The drive shaft 62 extends through the end walls 55, 56 and is suitably journaled thereto by journal means 63, 64 respectively. The shaft 62 therefore serves a support for the container 50 and also, unless otherwise restricted, permits relative angular movement to occur between the container 50 and the shaft 62.

Extending inwardly from the rear ends of the side beams 27, 28 are arcuate shaped brackets 70, 71 respectively, the inner ends of which are flanged rearwardly, as at 72, 73, and have apertures 74, 75. Mounted on the left end of the side walls 51, 52 respectively are a pair of angle irons 76, 77 having fore-and-aft extending flanges adaptable to lie proximate and adjacent to the rearwardly extending flange 72 of the bracket 70. Similarly on the right or opposite ends of the side walls 51, 52 are angle iron members 78, 79 respectively which also have fore-and-aft extending flanges which are adaptable to lie adjacent and approximate to the rearwardly extending flange 73 of the bracket 71. The fore-and-aft extending flanges of the angle iron members 76, 77, 78 and 79 are all suitably apertured, the apertures being registrable with the apertures 74, 75 in the flanges 72, 73. Bolts as at 80, 81 are provided to lock the container 50 in the position desired by inserting through the apertures 74, 75 and the corresponding apertures in the flange portions of the angle iron members 76—79. The plurality of apertures 74, 75 are provided to permit angular adjustment of the container 50 on the shaft 62.

The side wall 51 of the container 50 is provided with hinges 85. A shield or wall extension 86, extending the length of the container 50, is mounted on the hinges. End plates 87, 88 extend from the shield 86 to the shaft journals 63, 64.

Figure 4:
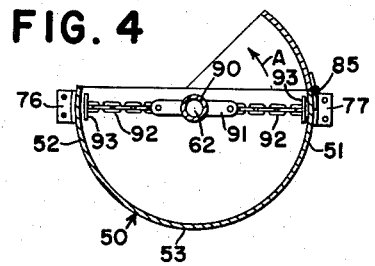
Fig. 4 is a sectional view taken substantially along the line 4—4 of Fig. 2.
Figure 7:
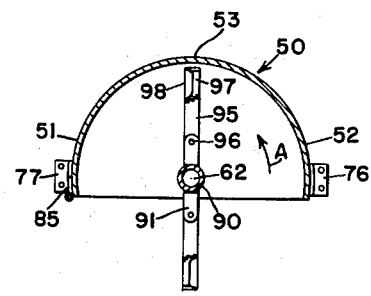
Fig. 7 is a sectional view taken substantially along the line 7—7 of Fig. 6.

Fixed to the shaft 62 for rotation in unison therewith is an elongated tubular member 90 extending substantially between the end walls 55, 56 of the container 50. Fixed to the outer surface of the tubular member 90 are a plurality of axially spaced U-shaped members 91. Pivotally mounted by pins 96 on the outer end of the U-shaped members or brackets 91 are flail means shown in one form of the invention, Figs. 1–4, as being a length of chain 92 with a drag 93 on the outer end of the chain which, when the chains 92 are extended, will operate adjacent to the walls of the container 50. In the form of the invention shown in Figs. 5–7, the flail means are in the form of rigid cutters 95 which are held by pivot pins 96 to the outer end of the U-shaped members or brackets 91. The outer ends of the flail members or knives are turned axially so as to provide a cutting edge 98 for severing crops. The flail means in either form as shown in Figs. 4 and 7 are interchangeable merely by removing the pivot pins 96 which holds the flails on the U-shaped members 91.

The shaft 62 is driven from the power take-off shaft by means of a telescoping type of drive shaft 100 connected at its forward end to the power take-off shaft 14 on the tractor by universal joint 101, and at its rearward end, by universal joint 102, to a beveled gear type of transmission indicated in its entirety by its housing 103. Extending outwardly from the housing 103 is a countershaft 104. The countershaft 104 is supported on the cross beam 21 by means of a journal 105 at its outer end, and carries at its outer end a sprocket 106 and chain 107, the latter of which drives a sprocket 108 fixed to the shaft 62.

The implement operates in the following manner. Should it be desired to discharge material, such as manure from the container 50, the implement is adjusted to a relatively high position as shown in Fig. 1, by adjustment of the lever 41. The flail means 92, 93 or 95 operate in the direction of the arrow A and serve to discharge material over the wall 52. Since the flail means are flexible they will wrap around the shaft and will unwind in proportion to the amount of material removed from the area of the shaft. Consequently, the free ends of the arm means or flails will move between a position adjacent to the shaft to a position spaced from the shaft. The shield 86 operates to prevent material from discharging forwardly. It should also be noted that when it is decided to operate the implement as a material unloader, the bolts 81 lock the brackets 70, 71 to the angle iron members 76, 78 on the side wall 52 of the container. The container 50 is therefore held rigidly in position.

Should it be desired to operate the implement as a chopper, the container 50 is rotated about the axis of the shaft 62 to a position where the bolts 80, 81 will lock the brackets 70, 71 to the angle iron members 77, 79 respectively so that the concavity of the container 50 opens downwardly. The lever 41 will then be moved to adjust the wheels in a manner shown in Fig. 5 so that the container is in a position closer to the ground. In this position of the container 50, the flail means on the shaft 62 will operate at a position substantially adjacent to the ground and when moving in the direction indicated by the arrow A will operate as a chopper. Obviously the shield 86 is removed in this operation. Thus, by a few minor adjustments in the implement, the implement itself may be used for two different types of operation, those operations being either as a material unloader or as a chopper.

It should be recognized that while two different types of flail means have been shown, one of which is preferably used when the implement is used as a material unloader and the other of which is preferably used when the implement operates as a chopper, either of the types of flails would operate in either operation. Also, it should be recognized that other forms of flails could be equally operated to advantage depending upon either the type of material to be unloaded or upon the type of material to be chopped. Consequently, the exact nature of the flails is unimportant and the variation shown was shown for purposes of fully explaining the invention.

It should also be recognized that while only one form of the invention was shown, other forms and variations will occur to those skilled in the art. It should therefore be understood that while the preferred embodiment was shown for the purpose of clearly and concisely illustrating the principles of the invention, it is desired not to so limit or narrow the invention beyond the broad general nature set forth in the appended claims.

What is claimed is:

1. An implement of the character described comprising: a main frame; wheel means adjustably mounted on the frame for effecting the vertical position of the frame relative to the ground and for moving the frame forwardly over a filed; an elongated implement body disposed transverse to the direction of travel, said implement body including fore-and-aft spaced vertically disposed and transverse side walls interconnected by a transverse wall to form a container having a U-shaped cross section, and transversely spaced end walls for closing opposite ends of the implement body; means maintaining the implement body on the frame including means therein to effect positioning of the body on the frame whereby the implement body may open upwardly or downwardly; a transverse rotatable shaft supported by the main frame extending longitudinally of the implement body between the sidewalls and spaced from the interconnecting wall; flail means mounted axially along the shaft, including arm elements extensible radially from the shaft whereby the free ends of the arms may move between positions adjacent to the shaft and positions spaced from the shaft, said positions of the arms being affected by the rate of rotation of the shaft and the restraining influence of material contained within the implement body; and drive means on the frame for effecting rotation of the shaft.

2. An implement of the character described comprising: a main frame movable over a field; wall means forming an elongated container having a U-shaped cross section including opposed side walls, an interconnecting wall between the side walls, and longitudinally spaced end walls for closing opposite ends of the container; structure on the frame for vertically adjusting the container on the frame; a rotatable shaft supported by the main frame extending longitudinally of the container between the sidewalls and spaced from the interconnecting wall; flail means mounted axially along the shaft, including arm elements extensible radially from the shaft whereby the free ends of the arms may move between positions proximate to the shaft and positions spaced from the shaft; means mounting the wall means on the frame whereby the container may be moved angularly relative to the axis of the drive shaft to cause the container to open downwardly or upwardly, to open either upwardly or downwardly; and drive means effecting rotation of the shaft.

3. An implement of the character described comprising: a main frame; wall means forming an elongated container having a U-shaped cross section including opposed side walls, an interconnecting wall between the side walls, and longitudinally spaced end walls for closing opposite ends of the container; structure on the frame for vertically adjusting the container on the frame; a rotatable shaft supported by the main frame extending longitudinally of the container between the sidewalls and spaced from the interconnecting wall; flail means mounted axially along the shaft; means mounting the wall means on the frame whereby the container may be moved angularly relative to the axis of the drive shaft to cause the container to open downwardly or upwardly, to open either upwardly or downwardly; and drive means effecting rotation of the shaft.

4. An amplement of the character described comprising: a main frame; wall means forming an elongated substantially semi-cylindrical shaped body with longitudinally spaced end walls for closing opposite ends of the body; a rotatable shaft substantially concentric with the body and supported by the main frame; flail means mounted axially along the shaft within the body; means mounting the wall means on the frame whereby the body may be moved angularly relative to the axis of the drive shaft to open either upwardly or downwardly; and drive means effecting rotation of the shaft whereby said flail means may operate as a forage harvester upon said body opening downwardly and as a material unloader upon said body opening upwardly.

5. An implement of the character described comprising: a main frame; wheel means adjustably mounted on the frame for effecting the vertical position of the frame relative to the ground and for moving the frame forwardly over a field; wall means forming an elongated implement body including spaced side walls, interconnected by a wall to form a U-shaped cross section, and longitudinally spaced end walls for closing opposite ends of the implement body; means maintaining the implement body on the frame including means therein to effect positioning of the body on the frame whereby the implement body may open upwardly or downwardly; a longitudinally extending rotatable shaft supported by the main frame and positioned within the implement body between the sidewalls and spaced from the interconnecting wall; flail means mounted axially along the shaft, including arm elements extensible radially from the shaft whereby the free ends of the arms may move between positions proximate the shaft and positions spaced from the shaft, said positions of the arms being affected by the rate of rotation of the shaft and the restraining influence of material contained within the implement body; and means on the frame for effecting rotation of the shaft.

References Cited in the file of this patent

UNITED STATES PATENTS

| 826,459 | Wilder | July 17, 1906 |
| 1,346,433 | Varland | July 13, 1920 |
| 1,435,766 | Varland | Nov. 14, 1922 |
| 2,556,446 | Roach | June 12, 1951 |
| 2,571,191 | Bowman | Oct. 16, 1951 |
| 2,718,741 | Meldahl | Sept. 27, 1955 |

FOREIGN PATENTS

| 299,827 | Germany | Aug. 16, 1917 |

OTHER REFERENCES

Publication: Gebrüder Busatis, German application 1,014,774, printed August 29, 1957 (KL.45A28).

UNITED STATES PATENT OFFICE
CERTIFICATE OF CORRECTION

Patent No. 2,952,465                                            September 13, 1960

Arnold B. Skromme

It is hereby certified that error appears in the above numbered patent requiring correction and that the said Letters Patent should read as corrected below.

Column 4, line 45, for "filed" read -- field --; column 5, line 8, for "upwardy" read -- upwardly --; same column 5, lines 8 and 9, and lines 23 and 24, strike out "to open either upwardly or downwardly;", each occurrence; same column 5, line 26, for "amplement" read -- implement --.

Signed and sealed this 27th day of February 1962.

(SEAL)
Attest:

ERNEST W. SWIDER
Attesting Officer

DAVID L. LADD
Commissioner of Patents